United States Patent [19]

Takashina et al.

[11] 4,287,113

[45] Sep. 1, 1981

[54] COATING COMPOSITION

[75] Inventors: Naomitsu Takashina, Yokohama; Masahiro Shimoi, Hiratsuka; Yoshinori Iwamoto, Odawara, all of Japan

[73] Assignee: Mitsubishi Gas Chemical Co., Inc., Tokyo, Japan

[21] Appl. No.: 102,920

[22] Filed: Dec. 12, 1979

Related U.S. Application Data

[63] Continuation of Ser. No. 943,794, Sep. 19, 1978, abandoned.

[30] Foreign Application Priority Data

Sep. 21, 1977 [JP] Japan .................................. 52/113743
Apr. 18, 1978 [JP] Japan .................................. 53/45680

[51] Int. Cl.$^3$ ................................................ C08K 5/05
[52] U.S. Cl. ............................................. 260/33.4 EP
[58] Field of Search ................. 260/33.2 EP, 33.4 EP

[56] References Cited

U.S. PATENT DOCUMENTS 3,454,418   7/1969   Forsberg ................................. 117/75

Primary Examiner—Paul R. Michl
Attorney, Agent, or Firm—Armstrong, Nikaido, Marmelstein & Kubovcik

[57] ABSTRACT

An ambient temperature curing coating composition having a good resistance to solvent and a good corrosion resistance is provided, and said composition comprises copolymers having pendant epoxy groups prepared by copolymerization of glycidyl acrylate or methacrylate or allyl glycidyl ether with at least one of other polymerizable monomers, 0.1 to 2 moles of phosphoric acid per one equivalent of the epoxy groups of the copolymers, and an organic solvent containing at least 5% by weight of an alcoholic solvent.

3 Claims, No Drawings

COATING COMPOSITION

This is a continuation of application Ser. No. 943,794, filed Sept. 19, 1978 now abandoned.

This invention relates to a coating composition, and more particularly to a coating composition containing copolymers having pendant epoxy groups, phosphoric acid, and an alcoholic solvent. The present coating composition forms a film insoluble in an organic solvent at the ambient temperature, and provides a film having a good resistance to solvents.

It is known to modify copolymers having pendant epoxy groups with phosphoric acid. For example, U.S. Pat. No. 2,723,971 discloses that more than an equivalent amount of 85% phosphoric acid is made to react with the epoxy groups to esterify the epoxy groups by phosphoric acid, and then the resulting esters are separated as polyphosphates by a non-solvent, purified by removing excess phosphoric acid therefrom, and dissolved in dilute alkali or, dilute ammonia, or the like, or said polyphosphates are dissolved in an organic solvent, and the resulting solution is used for coating, sizing for fibers, or treating for leather. J. Appl. Polymer Sci. 5 (13) 58–68 (1961) reports an effect of a ketone solvent in treating a composition of polymers having epoxy groups at side chains with phosphoric acid. It discloses that the so-called ketal type polymer, formed by the reaction of phosphoric acid with copolymers having epoxy groups at side chains in an excess of ketone solvent can be used as one-package type coating composition, which gives a crosslinked film with reasonable properties only when baked at a temperature of higher than 100° C.

As a result of extensive studies on the reaction of the compositions of copolymers having epoxy groups at side chains with phosphoric acid, the present inventors have found that a coating composition in the present invention is capable of forming a film having a high crosslinking density and excellent physical properties upon drying at an ambient temperature, which cannot be expected from said prior art.

An object of the present invention is to provide a coating composition curing at an ambient temperature.

Another object of the present invention is to provide a coating composition having a good corrosion resistance and an excellent adhesion to metallic substrates.

The present coating composition comprises (a) copolymers containing pendant epoxy groups, obtained by copolymerization of glycidyl acylate or methacrylate, or allylglycidyl ether with at least one of other polymerisable monomers, (b) 0.1 to 2 moles of phosphoric acid per one equivalent of the epoxy groups of said copolymers, and (c) an organic solvent containing at least 5% by weight of an alcoholic solvent in total solvents.

The present coating composition is normally prepared in two package type, namely (a) the solution of the copolymer with pendant epoxy groups and (b) the solution of phosphoric acid, and to avoid the possibility of premature gelation, and those two components are mixed together immediately before its application. However, with the presence of more than 30% by weight alcoholic solvent, the composition can be made in one-package type, for the mixture is stable enough for practical purposes at room temperature for a period in terms of years.

When the present coating composition is applied on articles to be coated upon the evaporation of solvent, crosslinking reaction proceeds quite rapidly at an ambient temperature, readily forming a film insoluble in organic solvents and with good physical properties. Of course, it is not objectionable to apply heat to cure after air drying if necessary. If heating is effected after air drying, the crosslinking reaction is further promoted, to give the film properties an improvement.

The present coating composition gives a good corrosion resistance for metallic substrates, particularly iron and aluminum, and thus can be used as a corrosion resistant coating without using harmful corrosion resistant pigments so far employed in the conventional corrosion resistant coating, such as lead compounds, chromium compounds, and so on, and also has a good adhesion to metals.

The conventional corrosion resistant pigments, such as molybdate or phosphate, extender pigments, coloring pigments, and so on, can be used with the present coating composition, if necessary, thereby much improving the corrosion resistance, adhesion and so on, and also ensuring a satisfactory corrosion resistance for a prolonged period of time.

The copolymers having pendant epoxy groups, one of constituents of the present coating composition, are copolymers comprised of (a) glycidyl acrylate or methacrylate, or allylglycidyl ether and (b) at least one of other polymerizable monomers. The copolymers may be the ordinary random copolymers, block copolymers or graft copolymers, which may be used alone or in mixture thereof.

Said polymerizable monomers (b) include acrylic acid or methacrylic acid esters represented by the following general formula:

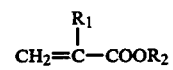

wherein $R_1$ is a hydrogen atom or an alkyl group having 1 to 3 carbon atoms, and $R_2$ an alkyl group or substituted alkyl group having 1 to 16 carbon atoms; styrene or its derivatives; vinyl acetate, acryl amide, methacryl amide, acrylonitrile, methacrylonitrile, etc.; other vinyl monomers copolymerizable with the monomer (a). In the preparation of the copolymers used in the present invention, it is necessary that the monomer (a) should be in a range of 2 to 60% by weight, preferably 5 to 30% by weight, on the basis of the total monomers.

Copolymerization of the monomer (a) with the monomer (b) is carried out in the presence of a well known free radical polymerization initiator according to the per se known method, such as a solution polymerization, a bulk polymerization method, and so on. In the present invention, the copolymers are used in solution in an organic solvent, and thus the copolymers obtained according to other polymerization methods than the solution polymerization method can be used after dissolved in a specific organic solvent.

Phosphoric acid, another constituent for the present coating composition, is added to the composition in a range of 0.1 to 2 moles per one equivalent of the epoxy groups of the copolymers. The phosphoric acid may be used in a solution of ordinary alcohol. It seems that the phosphoric acid of the present coating composition takes part in ring opening and crosslinking reactions of epoxy groups. If the amount of phosphoric acid is less than 0.1 mole in the present coating composition, satisfactory resistances to solvent and corrosion cannot be obtained, whereas the amount of phosphoric acid is more than 2 moles, a film having poor resistances to water and solvent is unpreferably formed. The phosphoric acid used in the present coating composition is generally 85% orthophosphoric acid, but any other phosphoric acids, such as, metaphosphoric acid, pyrophosphoric acid, polyphosphoric acid, etc. can be used, so long as they can attain the objects of the present invention.

Alcoholic solvent, further constituent for the present coating composition, is at least one of alcohols having 1 to 6 carbon atoms or ethyleneglycol monoalkyl ethers. The alcoholic solvent is a component indispensable for the crosslinking and stability of the present coating composition.

The alcoholic solvent can be used alone, but usually in a mixture of said alcohols or ethyleneglycol monoalkyl ethers with other organic solvents, when a solubility, and an affinity of the copolymers are taken into account. The other organic solvent is one or a combination of two or more of the ordinary organic solvents, such as aromatic hydrocarbons such as toluene or xylene; ketones such as methylethylketone or methylisobutylketone; aliphatic or alicyclic hydrocarbons such as normal hexane, cyclohexane, methylcyclohexane or ethylcyclohexane; esters such as ethyl acetate or butyl acetate. It is necessary that at least 5% by weight of the alcoholic solvent is present in the total solvents, as described above.

When the present coating composition is used as two-package type, the copolymer solution and the organic solvent solution containing phosphoric acid and the alcoholic solvent are mixed together prior to its application. If necessary, the resulting mixed solution is further diluted with a thinner, and used in coating. If the amount of the alcoholic solvent is less than 5% by weight in the total solvents, a film having considerably poor physical properties will be obtained.

The amount of the alcoholic solvent is appropriately adjusted in said range of the present invention in view of a composition of copolymers.

In the present coating composition, said copolymers can be used alone or in mixture with other modifying resin. The modifying resin is one or a combination of two or more of phenol-formaldehyde resin, urea-formaldehyde resin, melamine-formaldehyde resin, xylene-formaldehyde resin, alkyd resin, and so on, and characteristics of film can be modified by using such modifying resins. In that case, less than 50% by weight, particularly less than 30% by weight, of the modifying resin, on the basis of the copolymers, can be used, as desired.

The concentration of non-volatile matter in the present coating composition depends upon coating methods, and cannot be specified, but the present coating composition is used at 10 to 40% by weight, particularly 15 to 30% by weight.

The present coating composition can be applied to articles to be coated by air spray, roller coating, electrostatic coating, dip coating, and other various means of coating.

The present invention will be described in detail, referring to Examples, where parts are by weight.

Test procedures for physical properties of film shown in Examples are given below.

Test procedures for physical properties of film:

(1) IMPACT RESISTANCE

It is measured in accordance with JIS K-5400 using a Du Pont-type impact tester. This test is to examine whether cracks or peeling occurs in the film when a steel ball is dropped onto the surface of the film. The result is expressed by the maximum falling distance of the ball which does not cause cracks or peeling. The weight of the ball is 500 g or 350 g.

(2) FLEXURAL RESISTANCE

It is measured in accordance with JIS K-5400. Placing the coated surface outside, the test panel is bent by 180° around a spindle of a given diameter, and cracks or peeling occurring on the film at this time is examined. The resistance to bending is expressed by the minimum diameter of the spindle that does not cause cracks or peeling in the film.

(3) ERICHSEN TEST

An Erichsen tester supplied by Ueshima Seisakusho is used. A pushing mandrel of 20 mm in diameter with its tip being a spherical surface is pushed against the back of test panel. The film that has been pushed out is observed, and the pushed length of the test piece immediately before the occurrence of cracks or breakage is determined.

(4) PENCIL HARDNESS

It is measured in accordance with JIS K-5400 using a tester supplied by Ueshima Seisakusho. The resistance of the film to scratch is examined in terms of the breakage of the film with varying hardness of a pencil core.

(5) CROSS-CUT TEST

Eleven lines, running both longitudinally and transversely, are cut into the coated surface of the test piece at an interval of 1 mm to provide 100 squares each with 1 mm$^2$. An adhesive tape is applied onto the coated surface, and pulled away. The number of square left is counted. The tester used is a cross-cut tester supplied by Ueshima Seisakusho.

(6) ALKALI RESISTANCE

It is measured in accordance with JIS K-5400. The test panel is immersed in a 5% aqueous solution of sodium hydroxide for 3 hours at room temperature, and is immersed in a water for 21 hours at room temperature, and then, the state of the coating film is visually examined and rated on a scale of excellent>good>fair->poor.

(7) ACID RESISTANCE

It is measured in accordance with JIS K-5400. The test panel is immersed in a 5% solution of sulfuric acid for 24 hours at room temperature, and then, the state of the coating film is film is visually examined and rated on a scale of excellent>good>fair>poor.

(8) SOLVENT RESISTANCE (a) Resistance to methyl ethyl ketone (MEK)

It is measured in accordance with JIS K-5400. The test piece is immersed in reagent-grade MEK for 24 hours at room temperature, and then the state of the coating is visually examined and rated on a scale of excellent>good>fair>poor.

(b) Resistance to ethyl acetate

It is measured in accordance with JIS K-5400. The test piece is immersed in reagent-grade ethyl acetate for 24 hours at room temperature, and then, the state of the film is visually examined and rated on a scale of excellent>good>fair>poor.

(c) Resistance to salt water

It is measured in accordance with JIS K-5400. The test piece is sprayed with 5% aqueous solution of salt (NaCl) for 7 days at room temperature, and then the state of the coating film is visually examined and rated on a scale of excellent>good>fair>poor.

(9) SPOT TEST

Two to three drops of toluene or gasoline are placed on a coated test panel, and then wiped off with a gauze one minute thereafter to observe a change of coating film.

(10) RUBBING TEST

A coated surface on the test piece is reciprocatorily rubbed with a gauge impregnated with toluene or gasoline, and numbers of reciprocatory rubbings are counted until the coating film is peeled off.

(11) SECONDARY ADHESION TEST

After water resistance and salt water spray tests, six-lines, running both longitudinally and transversely, are cut into the coated surface of the test panel at an interval of 2 mm to provide 25 square areas each with 4 mm². An adhesive tape is applied onto the coated surface, and pulled away.

(12) WATER RESISTANCE

The coated test panel is immersed in water for 7 days at room temperature, and the state of the coating film is observed visually and rated on a scale of excellent>good>fair>poor.

EXAMPLE 1

(1) Synthesis of copolymers having pendant epoxy groups:

200 Parts of toluene was charged into an ordinary polymerization reactor attached with a stirrer, a reflux condenser, a thermometer, etc. after the air in the reactor was swept with nitrogen gas, heated to reflux with stirring. Then, a liquid mixture of 125 parts of styrene monomer, 122.5 parts of butyl acrylate, 50 parts of glycidyl methacrylate, and 2.5 parts of Perbutyl I as an initiator (tert-butylperoxyisopropyl carbonate made by Nihon Yushi K.K., Japan) was added thereto dropwise over a period of 3 hours to proceed with polymerization reaction. After the addition of monomer mixture, the resulting mixture was further stirred for 8 hours under reflux to complete polymerization.

A resin solution having a Gardner-Holt viscosity of Y (at 25° C.), non-volatile matters of 60.1% by weight, and an epoxy value of 0.062, was obtained with 99% conversion.

(2) Preparation of varnish

To 100 parts of said resin solution from (1) were added with 5 parts of toluene and 45 parts of isopropyl alcohol, and solvent composition of varnish was adjusted to a ratio of toluene to isopropyl alcohol of 1:1 and a content of non-volatile matters in the varnish to 40% by weight at the same time. Then, 5.47 parts of 85% orthophosphoric acid equivalent to 0.667 moles of the phosphoric acid to one equivalent of the epoxy group was added thereto to obtain a uniformly dissolved solution.

(3) Comparison of gel fraction and gelation speed of coating

Varnish prepared in said procedure (2) was applied to polyester films by means of a wire rod applicator, and dried under the conditions shown in Table 1. The coated films were dipped in acetone for one day, and then in boiling acetone for 7 hours to extract soluble matters. Insoluble matters after the extraction were dried at 100° C. for 2 hours and then amount are shown in Table 1 as gel fraction.

A comparative example using the resin solution prepared in (1) but methylethyl ketone in place of isopropyl alcohol in the varnish preparation (2) is also shown in Table 1.

TABLE 1

| Comparison of gel fractions | | |
|---|---|---|
| Drying conditions of coated panel | Present invention | Comparative Example |
| 20° C. 65% RH | | |
| 1 day | 73.6% | 6.0% |
| 3 days | 73.9% | 8.8% |
| 7 days | 74.1% | 8.9% |
| 80° C. | | |
| 15 minutes | 61.4 | 0 |
| 30 minutes | 63.6 | 0.4 |
| 45 minutes | 66.2 | 40.3 |
| 60 minutes | 68.7 | 46.9 |

As is evident from Table 1, the crosslinking speed of the present coating composition by drying at room temperature or relative low temperature is superior to that of the composition containing ketone solvent.

(4) Comparison of physical properties of coating

The varnish of the present invention prepared in said (2) and the comparative example containing methylethyl ketone in place of isopropyl alcohol were diluted by a thinner, individually, to a viscosity of 18 seconds by Ford cup No. 4, and spray coated onto polished bright milled steel plates, and dried at the normal temperature (20° C., 65% RH for 7 days). Physical properties of the resulting coating films are given for comparison in Table 2.

TABLE 2

| Test item | Test piece | Present invention | Comparative Example |
|---|---|---|---|
| Film thickness (μm) | | 23-31 | 21-31 |
| Impact resistance (½ in.) | | 500 g-10 cm | 500 g-10 cm |
| Erichsen test (mm) | | >7 | >7 |
| Flexural resistance (mm in diameter) | | <2 | <2 |
| Pencil hardness | | H | H |
| Cross-cut test | | 100/100 | 100/100 |
| Spot test (toluene) | | good | poor |
| (gasoline) | | excellent | fair |
| Rubbing test (toluene) | | 21 reciprocations | 5 reciprocations |
| (gasoline) | | 60 reciprocations | 12 reciprocations |
| Recoating test (tar modified epoxy resin) | | excellent | poor |
| Alkali resistance (5% caustic soda | | excellent | excellent |

TABLE 2-continued

| Test item | Test piece Present invention | Comparative Example |
|---|---|---|
| Acid resistance (5% sulfuric acid) | excellent | excellent |
| Solvent resistance | | |
| Methylethyl ketone | good | poor |
| Ethyl acetate | good | poor |
| Salt water spraying for 7 days | excellent | fair |

EXAMPLE 2

Effect of amounts of 85% orthophosphoric acid to be added to the copolymers containing glycidyl methacrylate in said (1) of Example 1, as shown in the following Table 3, upon the crosslinking speed of the coating composition was investigated and the results are given in the following Table 4.

TABLE 3

| | Mixing proportion | | | | |
|---|---|---|---|---|---|
| | Test panel No. | | | | |
| Item | 1 | 2 | 3 | 4 | 5 |
| Copolymer solution of (1) in Example 1 | 100 parts | 100 parts | 100 parts | 100 parts | 100 parts |
| Toluene | 5 parts | 5 parts | 5 parts | 5 parts | 5 parts |
| Isopropyl alcohol | 45 parts | 45 parts | 45 parts | 45 parts | 45 parts |
| 85% orthophosphoric acid | 13.67 parts | 8.20 parts | 5.47 parts | 3.28 parts | 1.64 parts |
| Mole of phosphoric acid per one equivalent of epoxy groups | 1.67 | 1.00 | 0.67 | 0.40 | 0.20 |

TABLE 4

| | Gel fraction (%) | | | | |
|---|---|---|---|---|---|
| Drying conditions | Test panel No. | | | | |
| | 1 | 2 | 3 | 4 | 5 |
| 20° C., 65% RH | | | | | |
| one day | 7.3 | 58.1 | 72.0 | 80.6 | 77.8 |
| 3 days | 7.5 | 58.3 | 72.0 | 82.1 | 86.4 |
| 7 days | 7.6 | 62.1 | 72.9 | 82.8 | 89.4 |
| 80° C. | | | | | |
| 15 minutes | 7.4 | 52.4 | 61.4 | 72.3 | 81.1 |
| 30 minutes | 14.5 | 53.3 | 63.6 | 74.1 | 84.6 |
| 60 minutes | 53.6 | 54.9 | 68.7 | 74.0 | 85.9 |

The gel fraction was determined according to Example 1.

EXAMPLE 3

75 Parts of allylglycidyl ether was charged into a 500 ml polymerization reactor attached with a stirrer, a reflux condenser, a thermometer, etc., after the air in the reactor was swept with nitrogen gas and heated with stirring. When the temperature of the reactor reached 120° C., a liquid mixture of 85 parts of n-butyl methacrylate, 44 parts of allylglycidyl ether, and 3.6 parts of dicumyl peroxide was added thereto over a period of one hour. After the completion of addition of monomers, the resulting mixture was further subjected to reaction for one hour, and then cooled. The entire amount of the reaction mixture was poured into 1,500 ml of n-hexane to precipitate the resulting polymers. Supernatant liquid was removed therefrom, and the remaining polymers were dried under a reduced pressure. The dried polymers had an epoxy value of 0.07.

To 40 parts of the polymers were added 13.3 parts of toluene, 13.3 parts of isopropyl alcohol, and 1.9 parts of 85% orthophosphoric acid, and the resulting mixture was sufficiently stirred, whereby a clear varnish was obtained. Viscosity of the resulting varnish was adjusted to 17 seconds by Ford cup No. 4, and the resulting varnish was spray coated onto polished bright milled steel plates and dried at the normal temperature (20° C., 65% RH for 7 days). Physical properties of the resulting coating film are given in the following Table 5.

TABLE 5

| Test item | |
|---|---|
| Film thickness (μm) | 20–30 |
| Impact resistance (½in.) | 500 g-10 cm |
| Erichsen test (mm) | 7 |
| Flexural resistance (mm in diameter) | >3 |
| Pencil hardness | F |
| Cross-cut test | 100/100 |
| Spot test (toluene) | Good |
| (gasoline) | excellent |
| Rubbing test (toluene) | 15 reciprocations |
| (gasoline) | 40 reciprocations |
| Recoating test (tar modified epoxy resin) | excellent |
| Alkali resistance (5% caustic soda) | excellent |
| Acid resistance (5% sulfuric acid) | excellent |
| Solvent resistance | |
| Methylethyl ketone | good |
| Ethyl acetate | good |
| Salt water spraying for 7 days | excellent |

EXAMPLE 4

65 Parts of toluene was charged into the same polymerization reactor as used in Example 1 after the air in the reactor was swept with nitrogen gas, heated and stirred under reflux. Then, a liquid mixture of 55 parts of methyl methacrylate, 30 parts of butyl acrylate, 15 parts of glycidyl methacrylate, and 0.86 parts of Perbutyl I as an initiator (tert.-butylperoxyisopropyl carbonate, made by Nihon Yushi K.K., Japan) was added thereto over a period of 3 hours to proceed with polymerization reaction. After the completion of addition, the resulting mixture was further stirred under reflux for three hours to complete the polymerization.

Thus, a resin solution having a Gardner-Holt viscosity of $Z_7-Z_8$ (at 25° C.), non-volatile matters of 60% by weight, and epoxy value of 0.063, was obtained at 99% conversion.

(1) 75 Parts of the resulting resin solution was admixed with 25 parts of toluene to prepare a solution having a content of non-volatile matters of 45% by weight as A-I. Similarly, 75 parts of the resulting resin solution was admixed with 25 parts of isopropanol to prepare a solution A-II.

(2) Preparation of phosphoric acid solution

20 Parts of 85% orthophosphoric acid was mixed with 80 parts of isopropanol to prepare a solution B-I.

Similarly, 20 parts of 85% orthophosphoric acid was mixed with 80 parts of ethyl acetate to prepare a solution B-II.

Similarly, 20 parts of 85% orthophosphoric acid was mixed with 80 parts of ethyleneglycol monoethyl ether to prepare a solution B-III.

Similarly, 20 parts of polyphosphoric acid was mixed with 80 parts of isopropanol to prepare a solution B-IV.

(3) Preparation of varnish for coating

Varnishes (I), (II), (IV) and (V) within the scope of the present invention and a varnish (III) outside the scope of the present invention were prepared by changing combinations of solutions A and solutions B on the basis of alcohol content of the total solvents of varnishes prepared in the following manner.

(I) 85 Parts of solution A-I was mixed with 15 parts of solution B-I, and further with 125 parts of a mixed solvent having a mixing ratio of toluene/n-butanol-/ethyl acetate/acetate cellosolve of 6/2/1/1 as a thinner to prepare a varnish having 20% by weight of alcohol content in total solvents, 24% by weight of non-volatile matters, and a viscosity of 15 seconds by Ford cup No. 4.

(II) 85 Parts of solution A-I was mixed with 15 parts of solution B-II, and further with 125 parts of the mixed solvent having the same constituent as in (I) as a thinner to prepare a varnish having 11% by weight of alcohol content in total solvents, 24% by weight of non-volatile matters, and a viscosity of 15 seconds by Ford cup No. 4.

(III) 85 Parts of solution A-I was mixed with 15 parts of solution B-II, and further with 125 parts of a mixed solvent having a mixing ratio of toluene/butyl acetate/ethyl acetate/acetate cellosolve of 6/2/1/1 as a thinner to prepare a varnish free from alcohol with 24% by weight of non-volatile matters, and a viscosity of 15 seconds by Ford cup No. 4.

(IV) 85 Parts of solution A-I was mixed with 15 parts of solution B-III, and further with 125 parts of a mixed solvent having a mixing ratio of toluene/ethyleneglycol monoethyl ether/ethyl acetate/acetate cellosolve of 6/2/1/1 as a thinner to prepare a varnish having an alcohol (ethyleneglycol monoethyl ether) content in total solvents of 20% by weight, 24% by weight of non-volatile matters, and a viscosity of 15 seconds by Ford cup No. 4.

(V) 85 Parts of solution A-I was mixed with 15 parts of solution B-IV, and further with 125 parts of a mixed solvent having a mixing ratio of toluene/n-butanol-/ethyl acetate/acetate cellosolve of 6/2/1/1 as a thinner to prepare a varnish having 20% by weight of alcohol in total solvents, 24% by weight of non-volatile matters, and a viscosity of 16 seconds by Ford cup No. 4.

(4) Comparison of physical properties of coating films

The solutions (I), (II), (III), (IV), and (V) were prepared in one-package type solutions, and immediately after preparation they were used for spray coating onto bright milled steel plates, and dried in the air at 20° C. and 65% RH. The dried coating films were left standing for 7 days, and then physical properties of the coating films were determined. The results are given in Table 6.

TABLE 6

| Test item | Present invention (I) | Present invention (II) | Comp. Ex. (III) | Present invention (IV) | Present invention (V) |
|---|---|---|---|---|---|
| Film thickness (μm) | 23–29 | 29–36 | 29–39 | 33–30 | 25–35 |
| Impact resistance (⅜ in.) | 500g–30cm | 500g–40cm | <300g–10cm | 500g–30cm | 500g–20cm |
| Erichsen test (mm) | >7 | >7 | >7 | >7 | >7 |
| Flexural resistance (mm in diameter) | <3 | <3 | <3 | <3 | < |
| Pencil hardness | 2H | H | F | H | H |
| Crosscut test | 100/100 | 100/100 | 0/100 | 100/100 | 100/100 |
| Spot test (toluene) | excellent | excellent | excellent | excellent | excellent |
| (gasoline) | excellent | excellent | excellent | excellent | excellent |
| Rubbing test (toluene) | >100 reciprocations | >100 reciprocations | >100 reciprocations | >100 reciprocations | >100 reciprocations |
| (gasoline) | >100 reciprocations | >100 reciprocations | >100 reciprocations | >100 reciprocations | >100 reiprocations |
| Recoating Test (tar modified expoxy resin) | excellent | excellent | excellent | excellent | exellent |
| Alkali resistance (5% caustic soda) | excellent | excellent | fair | excellent | excellent |
| Water resistance (dipping for 7 days) | excellent | excellent | good | excellent | excellent |
| Secondary adhesion after water resistance | 25/25 | 25/25 | 0/25 good or | 25/25 | 25/25 |
| Salt water spraying for 7 days | excellent | excellent | fair | exellent | excellent |
| Secondary adhesion after salt water spraying | 25/25 | 25/25 | 0/25 | 25/25 | 25/25 |

What is claimed is:

1. An ambient temperature-curing coating composition which comprises a solution of (1) components reactive with each other to form a film upon curing at ambient temperature and (2) a solvent; said film-forming components (1) being:
    (a) copolymers having pendant epoxy groups prepared by copolymerization of 2 to 60% by weight, on the basis of total monomers, of glycidyl acrylate or methacrylate or allylglycidyl ether with at least one other polymerizable monomer and
    (b) 0.1 to 2 moles of phosphoric acid per one equivalent of the epoxy groups of the copolymers, and said solvent (2) being
    (c) at least 5% by weight based on the weight of the solvent (2) of an alcoholic solvent and
    (d) at least one other organic solvent.

2. A coating composition according to claim 1, wherein the alcoholic solvent is an alcohol having 1 to 6 carbon atoms or ethylene glycol monoalkyl ether.

3. A coating composition according to claim 1, wherein the polymerizable monomer is at least one member selected from styrene or its derivatives, acrylic acid esters, and methacrylic acid esters.

* * * * *